United States Patent Office 3,714,773
Patented Feb. 6, 1973

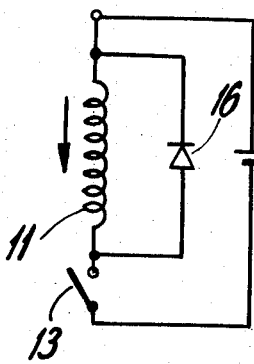
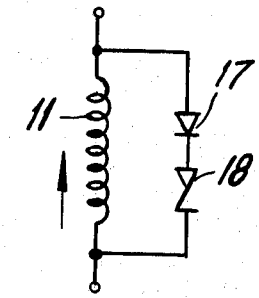
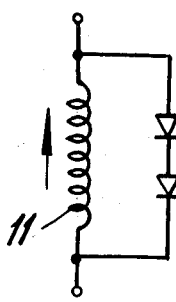
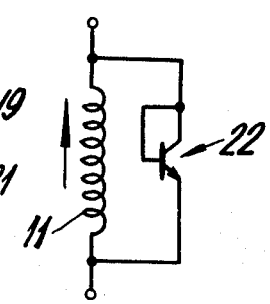
FIG. 1  FIG. 2a  FIG. 2b  FIG. 2c
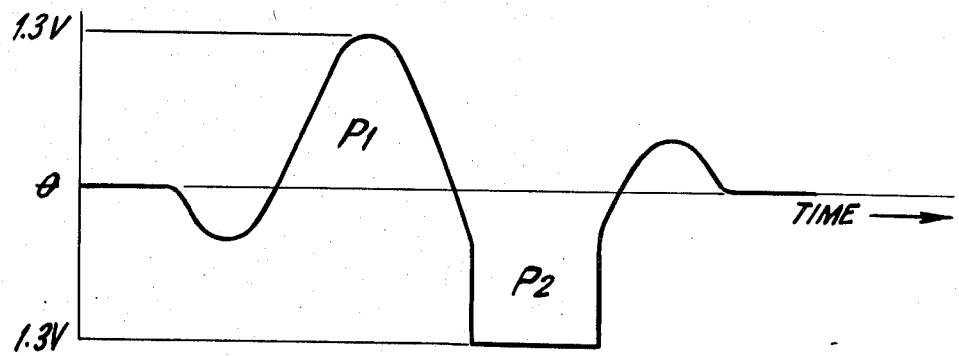
FIG. 3
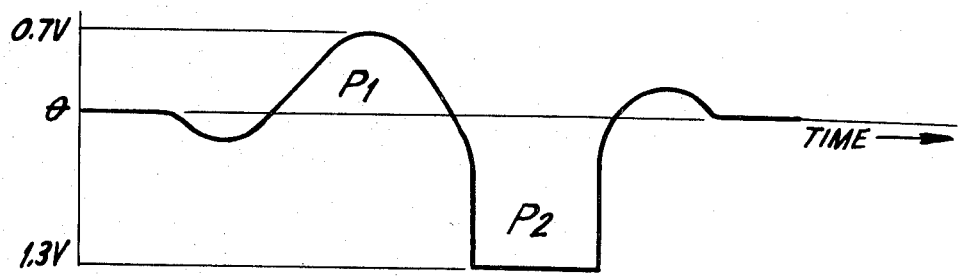
FIG. 4

3,714,773
AMPLITUDE CONTROL MEANS FOR BALANCE WHEEL OSCILLATOR
Gunther Rudolph Diersbock, Waterbury, Conn., assignor to Timex Corporation, Waterbury, Conn.
Filed Nov. 1, 1971, Ser. No. 194,392
Int. Cl. G04c 3/04; H02k 33/02
U.S. Cl. 58—28 B          5 Claims

ABSTRACT OF THE DISCLOSURE

A means for controlling the amplitude of balance wheel oscillators used in timepieces which comprises predetermined semiconductor devices connected in parallel across the driving coil of an oscillator. The semiconductor device which may, for example, comprise a diode is mounted on a coil-carrying balance wheel in a simple and expeditious manner. This arrangement when employed in a timepiece having mechanical contacts also minimizes contact wear.

BACKGROUND OF THE INVENTION

The present invention relates to horological instruments such as balance wheel oscillators and more particularly to a means for controlling the amplitude of said oscillators.

In battery-powered timepieces, a conventional design involves a contact switch which is periodically closed by a coil-carrying balance wheel during its oscillations. The switch completes a circuit through the coil to provide a driving impulse in connection with a stationary magnet system positioned opposite the coil.

Through shocks or accelerations, balance wheel amplitudes vary considerably. If a low nominal amplitude (low driving force) is used and the shock reduces the amplitude, considerable time is needed to bring the amplitude to its nominal value. If a high nominal amplitude (high driving force) is used and the shock increases the amplitude, the balance wheel could overbank. In both cases, timekeeping will be adversely affected.

By connecting a semiconductor device in parallel with a driving coil, a high driving force can be used because the semiconductor determines the nominal amplitude. This results in a faster return of low amplitudes to nominal and in dampening high amplitudes above nominal thereby preventing to a great extent overbanking and errors of timekeeping caused by shocks or voltage variations. Any desired amplitude voltage characteristic (amplitude control) can be established by selecting the right break through voltage of the semi-conductor device in order to dampen the high amplitudes, and by establishing the necessary driving power requirement to increase the low amplitudes rapidly. This system also prevents contact burning to a considerable degree.

Among the more pertinent prior art disclosures are Ganter U.S. Pat. 3,293,568 and Reich U.S. Pat. 3,336,537. The Ganter patent, however, discloses an electronic driving circuit for a timepiece including a diode connected in parallel across a sensing coil to regulate driving current. Reich on the other hand, discloses a driving circuit employing a sensing coil and a driving coil with diodes mounted in parallel with the driving coil. The diodes are polarized in the direction of driving current flow and function as an overflow valve when high voltage occurs.

SUMMARY OF THE INVENTION

As distinguished from the prior art described above, the present invention relates to a mechanical contact system without a sensing coil, having predetermined semiconductor devices such as diodes connected across the driving coil. The diodes are polarized in a direction opposite to the driving current flow and function as a valve to allow the flow of reversed current when the induced voltage reaches a certain voltage level created by high amplitudes. The driving current flow is not controlled and the diode functions as a damping device at high amplitudes.

Accordingly, it is an object of this invention to provide a new, inexpensive and improved means for controlling the amplitude of balance wheel oscillators used in timepieces.

A more specific object of this invention is to provide a new and improved means for controlling the amplitude of a contact watch including semiconductor devices mounted in parallel with the driving coil and polarized in a direction opposite to the driving current.

BRIEF DESCRIPTION OF THE DRAWINGS

Other objects and advantages of the present invention may be more clearly seen when viewed in conjunction with the accompanying drawings wherein:

FIG. 1 is a circuit diagram for a typical timepiece including the present invention;

FIGS. 2a, 2b, and 2c depict various embodiments of the semiconductor device to be used in the circuit of FIG. 1.

FIG. 3 shows a voltage-time diagram for a typical three magnet balance wheel motor system without amplitude control, the coil being mounted to the oscillating balance wheel;

FIG. 4 shows the same voltage-time diagram but at low amplitudes;

DETAILED DESCRIPTION OF THE INVENTION

Figure 8:
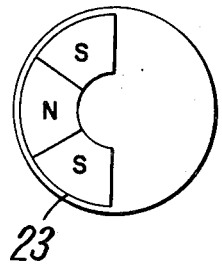
FIG. 8 shows a typical three magnet arrangement which interacts with the coil 11.
Figure 7:
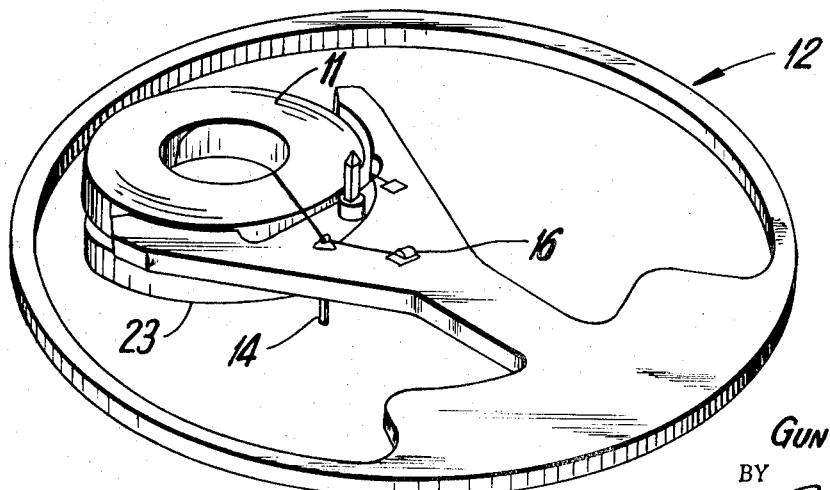
FIG. 7 shows the mounting of the semiconductor device on the balance wheel.

Referring now to the drawings, the invention comprises a horological instrument having a circuit as shown in FIG. 1 wherein a moving coil 11 is mounted on an oscillatory balance wheel 12 opposite stationary magnet or magnets 23 as shown in FIG. 7 and 8. The interaction of the driving coil 11 and magnet means is conventional and well-known in the art with typical three magnet systems being shown in Zemla Pat. 3,046,460 and the pending application of Norman C. Zatsky, Ser. No. 131,237, filed Apr. 5, 1971 and assigned to the present assignee of record. Accordingly, driving pulses are induced in the coil 11 during the movement of the balance wheel 12 past the magnet provided switch 13 is closed. The arm of switch 13 is mounted opposite the balance wheel 12 to intermittently engage a contact 14 during the movement of balance wheel and connect the energy cell 15 into the circuit. A typical contact spring assembly is shown in the pending application of E. Kaulins S.N. 62,302, filed July 20, 1970, which is assigned to the assignee of record of the present invention.

A diode 16 is mounted on the balance wheel 12 in parallel with the coil 11, see FIGS. 1 and 7. The diode 16 is polarized in a direction opposite to that of the driving current and functions as a damping device at high amplitudes. The diode 16 permits the flow of reverse current when the voltage induced in the coil 11 reaches a predetermined voltage level created by high amplitudes. Alternatives to the diode 16 of FIG. 1 are the series connected diode 17 and Zener diode 18 of FIG. 2a, the series connected diode 19 and 21 of FIG. 2b and the transistor 22 of FIG. 2c which are similarly polarized. The values of the various semiconductor devices would of course be selected to provide the desired damping effect.

Figure 5:
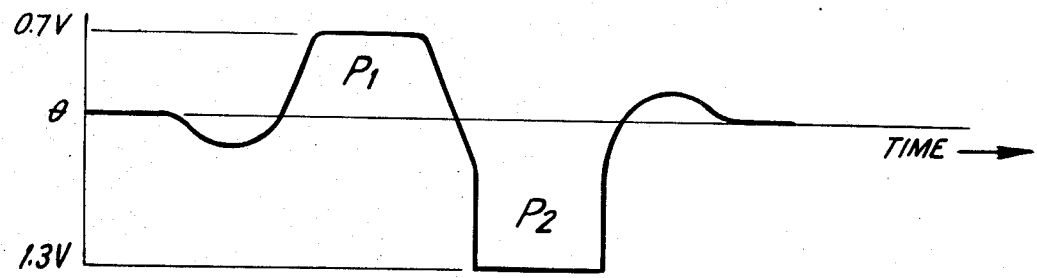
FIG. 5 shows the voltage-time diagram of the aforementioned oscillator with amplitude control.

FIG. 3 shows a typical voltage-time diagram for a conventional three magnet balance wheel motor system without amplitude control. In such a system, the coil 11 interacts with the three magnetic fields as it oscillates therethrough, the interaction importing an impulse to the balance wheel 12. The induced voltage pulses $P_1$ ranges up to a value of 1.3 volts while the driving voltage pulse $P_2$ has a maximum voltage of 1.3 volts in the negative direction. At low amplitudes, the $P_1$ voltage is below 0.7 volt, the selected break-through voltage. Full driving power accelerates the balance wheel oscillator and the amplitude increases rapidly. With the present invention, however, when the amplitude of the voltage $P_1$ reaches the break-through voltage level of the semiconductor device 16 or 17–18 or 19–21 or 22, as the case may be, the device starts to conduct. This dampens the system in the high amplitude range as shown in FIG. 5 where $P_1$ is limited to 0.7 volt.

Figure 6:
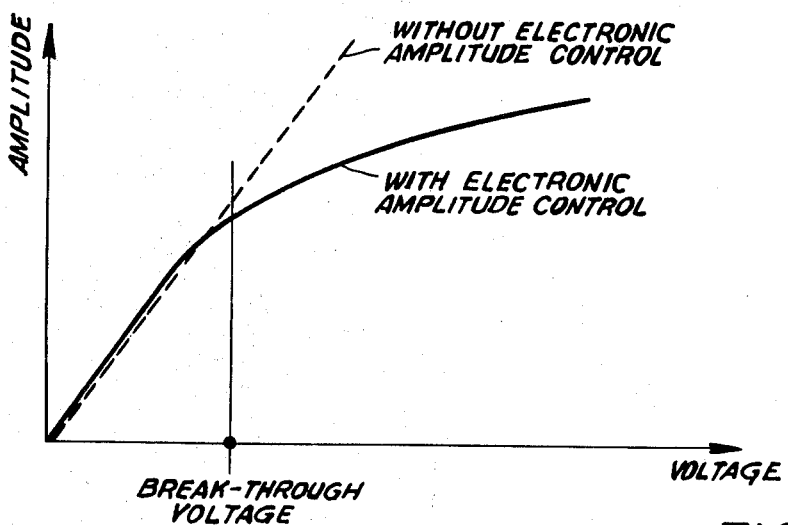
FIG. 6 shows the amplitude voltage diagram of the balance wheel oscillator both with and without amplitude control.

FIG. 6 shows the relationship between amplitude and voltage in typical instances both with and without the present invention. It is noted, that the curve bends over or is damped at the break-through voltage with amplitude control while it continues to increase linearly without amplitude control. Any desired amplitude-voltage characteristic may be established (amplitude control) by selecting a corresponding break-through voltage for the diode 16 and by providing the necessary driving power to increase the low amplitudes rapidly.

It is to be understood that the above-described arrangements are merely illustrative examples of the application. Numerous other arrangements may be readily devised by those skilled in the art which will embody the principles of the invention and fall within the spirit and scope thereof.

I claim:

1. In a battery powered timepiece having magnet means and driving coil means mounted on an oscillatory balance wheel interacting therewith, the combination comprising:

a switch contacted by the balance wheel during the oscillations thereof to supply power to the coil from the battery, semiconductor means mounted on the balance wheel in parallel with the coil means to dampen the amplitude by permitting the flow of reverse current across the coil means when the voltage induced in the coil means reaches a predetermined level caused by an increase in amplitude.

2. A timepiece in accordance with claim 1 wherein: the semiconductor means comprises at least one diode polarized in a direction opposite to the driving current flow.

3. A timepiece in accordance with claim 1 wherein: the semiconductor means comprises a diode and a Zener diode connected in series therewith, both diodes being polarized in a direction opposite to the driving current flow.

4. A timepiece in accordance with claim 1 wherein: the semiconductor means comprises a transistor having its base and collector connected to one end of the coil means and its emitter connected to the other end of the coil means.

5. A timepiece in accordance with claim 2 wherein: the magnet means comprises a three magnet arrangement wherein the magnets are mounted in a stationary array of alternating plurality opposite the balance wheel, and the switch means comprises a switch arm mounted opposite the balance wheel to engage contact means on the balance wheel during the oscillations thereof, said diode dampening the amplitude to prevent overbanking and contact burning during said engagement.

References Cited

UNITED STATES PATENTS 3,491,531  1/1970  Wiesner _____ 58—28 R

FOREIGN PATENTS 39,309   8/1965   East Germany ____ 58—23 AC
974,423  11/1964  Great Britain _____ 58—23 A
351,906  3/1961   Switzerland _____ 58—28 B RICHARD B. WILKINSON, Primary Examiner E. S. JACKMON, Assistant Examiner U.S. Cl. X.R.

310—25; 318—132